(12) United States Patent
Hongo et al.

(10) Patent No.: US 11,925,243 B2
(45) Date of Patent: Mar. 12, 2024

(54) JEWELRY MEMBER

(71) Applicant: KYOCERA Corporation, Kyoto (JP)

(72) Inventors: Hiroyuki Hongo, Kyoto (JP); Kaoru Yamamoto, Kyoto (JP)

(73) Assignee: KYOCERA CORPORATION, Kyoto (JP)

( * ) Notice: Subject to any disclaimer, the term of this patent is extended or adjusted under 35 U.S.C. 154(b) by 585 days.

(21) Appl. No.: 17/258,338

(22) PCT Filed: Jul. 9, 2019

(86) PCT No.: PCT/JP2019/027153
§ 371 (c)(1),
(2) Date: Jan. 6, 2021

(87) PCT Pub. No.: WO2020/017397
PCT Pub. Date: Jan. 23, 2020

(65) Prior Publication Data
US 2021/0196013 A1    Jul. 1, 2021

(30) Foreign Application Priority Data

Jul. 17, 2018  (JP) ................................ 2018-133944

(51) Int. Cl.
| | |
|---|---|
| *A44C 17/00* | (2006.01) |
| *C04B 35/14* | (2006.01) |
| *C04B 41/00* | (2006.01) |
| *C04B 41/48* | (2006.01) |
| *C04B 41/83* | (2006.01) |
| *F21K 2/00* | (2006.01) |

(52) U.S. Cl.
CPC .............. *A44C 17/00* (2013.01); *C04B 35/14* (2013.01); *C04B 41/009* (2013.01); *C04B 41/4853* (2013.01); *C04B 41/83* (2013.01); *F21K 2/00* (2013.01); *C04B 2235/3418* (2013.01); *C04B 2235/528* (2013.01); *C04B 2235/9661* (2013.01)

(58) Field of Classification Search
CPC ...................................................... A44C 17/00
See application file for complete search history.

(56) References Cited

U.S. PATENT DOCUMENTS 5,383,100 A * 1/1995 Kikos ..................... G09F 13/20
362/104

FOREIGN PATENT DOCUMENTS

| | | |
|---|---|---|
| CN | 2075453 U | 4/1991 |
| CN | 204781702 U | 11/2015 |
| JP | 2007-290938 A | 11/2007 |
| JP | 5052045 B2 | 8/2012 |
| KR | 20030064122 A * | 7/2003 |

* cited by examiner

*Primary Examiner* — Jack W Lavinder
(74) *Attorney, Agent, or Firm* — Procopio, Cory, Hargreaves & Savitch LLP

(57) ABSTRACT

The jewelry member according to the present disclosure includes: a plurality of spherical bodies that are three-dimensionally arranged regularly and include an amorphous silicic acid; and a resin that is located in a gap among adjacent spherical bodies of the plurality of spherical bodies and includes a fluorescent dye.

4 Claims, 1 Drawing Sheet

JEWELRY MEMBER

TECHNICAL FIELD

The present disclosure relates to a jewelry member.

BACKGROUND

Jewelry members such as artificial opal having play of color are known (see, for example, Patent Document 1).

RELATED ART DOCUMENT

Patent Document

Patent Document 1: Japanese Patent No. 5052045

SUMMARY

The jewelry member according to the present disclosure includes: a plurality of spherical bodies that are three-dimensionally arranged regularly and include an amorphous silicic acid; and a resin that is located in a gap among adjacent spherical bodies of the plurality of spherical bodies and includes a fluorescent dye.

EMBODIMENTS

<Jewelry Member>

Hereinafter, a jewelry member according to an embodiment of the present disclosure will be described in detail with reference to the drawings. However, in the figures referred to below, only the configuration necessary for explaining an embodiment is simplified and shown for convenience of explanation. Therefore, the jewelry member according to the present disclosure can include any configuration not shown in the figures referred to. In addition, the dimension of the configuration in the figures does not faithfully represent the dimension, the dimensional ratio, and the like of the actual configuration.

Figure 1:
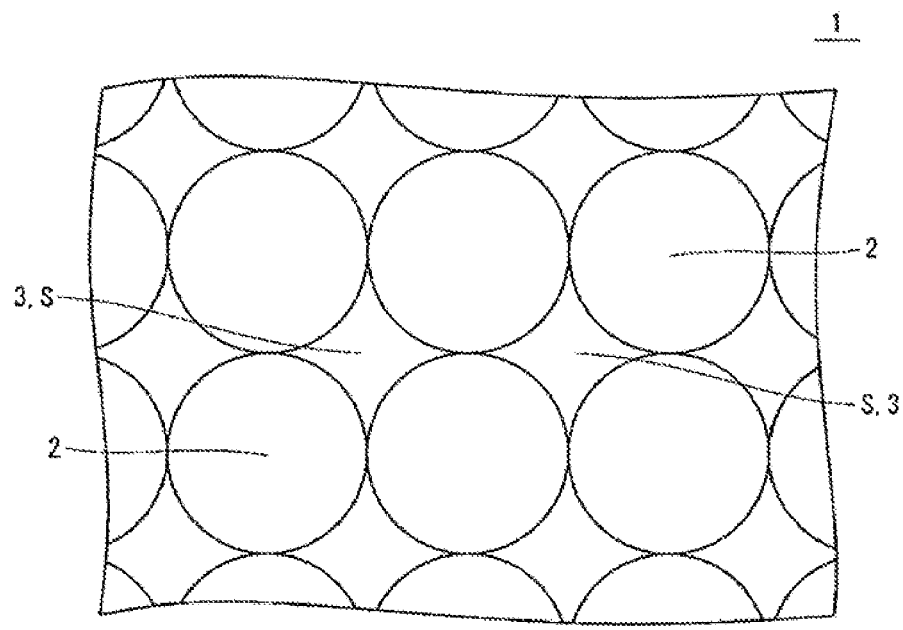
FIG. 1 is an enlarged schematic view showing a part of a jewelry member according to an embodiment of the present disclosure.

As shown in FIG. 1, a jewelry member 1 includes a plurality of spherical bodies 2 that are three-dimensionally arranged regularly, and a resin 3 that is located in a gap S among adjacent spherical bodies 2 of the plurality of spherical bodies 2. All the plurality of spherical bodies 2 include an amorphous silicic acid. The resin 3 includes a fluorescent dye. The jewelry member 1 including such a configuration has play of color, and exhibits an effect of emitting light with a high fluorescence emission intensity. Hereinafter, the configuration of the jewelry member 1 will be specifically described.

The phrase "the plurality of spherical bodies 2 are three-dimensionally arranged regularly" refers to a state that the plurality of spherical bodies 2 are arranged so that the incident light can be Bragg diffracted. More specifically, the phrase refers to a state that the plurality of spherical bodies 2 are arranged so as to form a simple cubic structure, a face-centered cubic structure, a hexagonal close-packed structure, a body-centered cubic structure, or a composite structure in which these structures partially coexist.

If the plurality of spherical bodies 2 including an amorphous silicic acid are three-dimensionally arranged regularly, the jewelry member 1 has play of color. The phrase "play of color" refers to an effect that the color tone of the jewelry member 1 is varied depending on the angle of viewing the jewelry member 1.

The structure in which the plurality of spherical bodies 2 including an amorphous silicic acid are three-dimensionally arranged regularly can be referred to as an opal structure. Therefore, it may be said that the jewelry member 1 has an opal structure.

The spherical body 2 includes an average diameter of, for example, 5 to 450 nm. The variation in the diameter of the spherical body 2 is, for example, ±15%. The average diameter and the variation in the diameter are values obtained by measurement with, for example, a scanning electron microscope (hereinafter, sometimes referred to as "SEM").

The fluorescent dye includes a function of absorbing ultraviolet light including a wavelength of 300 to 400 nm and converting it into blue visible light including a wavelength of 400 to 450 nm and emitting the visible light. Because the resin 3 including such the fluorescent dye is located in the gap S in the jewelry member 1, the jewelry member 1 emits light due to the fluorescent dye if irradiated with ultraviolet light from, for example, a black light. The jewelry member 1 may emit light so as to include two light emission peaks in the wavelength range of 400 to 450 nm. Note that the jewelry member 1 emits light to some extent if irradiated with, for example, sunlight instead of ultraviolet light.

Here, the jewelry member 1 emits light with a high fluorescence emission intensity. The reason for this fact is presumed to be as follows. If irradiated with ultraviolet light, the jewelry member 1 emits light not only on the surface but also on the inside due to the structure in which the plurality of spherical bodies 2 including an amorphous silicic acid are three-dimensionally arranged regularly. Furthermore, it is presumed that not only because light is emitted on the surface and the inside of the jewelry member 1, but also because light is reflected on the surface and the inside of the jewelry member 1 due to the above-described structure, the light emission is amplified to increase the fluorescence emission intensity. The ratio of the emission intensity of the jewelry member 1 to that of a single resin containing the fluorescent dye at the same proportion may be twice or more. The fluorescence emission intensity can be measured with, for example, a fluorescence spectrophotometer.

The fluorescent dye is not particularly limited as long as it includes the above-described function, and general fluorescent dyes for a resin can be used. Specific examples of the fluorescent dye include fluorescent dyes including a coumarin derivative. As the fluorescent dye, a commercially available product can be used. Examples of the commercially available fluorescent dye include "Hakkol PSR" manufactured by SHOWA CHEMICAL INDUSTRY CO., LTD. The fluorescent dye is not limited to the exemplified fluorescent dyes.

The resin 3 functions as a member to fix the fluorescent dye in the gap S. Furthermore, if the resin 3 is located in the gap S, the jewelry member 1 includes strength suitable for processing, so that the processability of the jewelry member 1 is enhanced.

Examples of the resin 3 include thermosetting resins. In the case that the resin 3 is a thermosetting resin, the productivity of the jewelry member 1 is enhanced because the workability is excellent at the time of filling the resin 3 including the fluorescent dye in the gap S. Examples of the thermosetting resin include an epoxy resin. The resin 3 is not limited to the exemplified resins.

The gap S is formed by the plurality of spherical bodies 2 adjacent to each other. There may be a plurality of gaps S. In the case that there are a plurality of gaps S, the resin 3 including the fluorescent dye does not need to be located in all of the plurality of gaps S. That is, the resin 3 including the fluorescent dye does not need to be located in all of the plurality of gaps S as long as the jewelry member 1 can emit light due to the fluorescent dye if irradiated with ultraviolet light.

The content of the spherical body 2 may be more than the content of the resin 3. Specifically, for example, the content of the spherical body 2 may be 75 to 85% by mass, and the content of the resin 3 may be 15 to 25% by mass in the jewelry member 1 based on 100% by mass of the total of the spherical body 2 and the resin 3.

The content of the fluorescent dye in the resin 3 may be 0.01 to 0.5 parts by mass based on 100 parts by mass of the resin. The above-described content is less than the usual amount of the fluorescent dye added to a single resin including no opal structure. According to the jewelry member 1, even if the fluorescent dye is added in an amount less than the usual addition amount to a single resin, the fluorescence emission intensity can be obtained that is equal to or more than that in the case of adding the fluorescent dye to a single resin in the usual amount because the light emission is amplified for the above-described reason. Furthermore, in the case that the above-described configuration is satisfied, the content of the fluorescent dye is reduced, so that the coloring of the jewelry member 1 by the fluorescent dye can be suppressed.

Examples of the use of the jewelry member 1 include, but are not limited to, artificial nails, rings, pendants, jewelry boards, clothing, and interiors.

<Method for Manufacturing Jewelry Member>

Next, the method for manufacturing the jewelry member according to an embodiment of the present disclosure will be described in detail by taking the case of obtaining the above-described jewelry member 1 as an example.

First, a plurality of spherical bodies 2 including an amorphous silicic acid and a dispersion medium in which the plurality of spherical bodies 2 are dispersed are stirred and mixed to obtain a dispersion of the spherical body 2.

Examples of the dispersion medium include water. For example, the ratio of the spherical body 2 is 10 to 30% by volume, and the ratio of the dispersion medium is 70 to 90% by volume based on 100% by volume of the total of the spherical body 2 and the dispersion medium.

Next, the obtained dispersion is left, and the spherical body 2 is spontaneously settled to generate a jelly-like substance in which the plurality of spherical bodies 2 are regularly arranged. The jelly-like substance is naturally dried in the air to obtain a dried product. The obtained dried product is calcined to obtain a three-dimensional array structure of the spherical body 2. The calcining temperature is, for example, 250 to 900° C.

Then, a gap S of the three-dimensional array structure is filled with a resin 3 including a fluorescent dye to obtain a jewelry member 1. In the case that the resin 3 is a thermosetting resin, after the gap S is filled with the thermosetting resin including the fluorescent dye, heat treatment needs to be performed to cure the thermosetting resin. The heat treatment temperature is, for example, 80 to 150° C.

Hereinafter, the present disclosure will be described in detail with reference to Examples, but the present disclosure is not limited to Examples described below.

EXAMPLES

Example 1

<Preparation of Jewelry Member>

First, a plurality of spherical bodies including an amorphous silicic acid and a dispersion medium were stirred and mixed to obtain a dispersion of the spherical body. As the dispersion medium, water was used. The ratio of the spherical body was 20% by volume, and the ratio of the dispersion medium was 80% by volume based on 100% by volume of the total of the spherical body and the dispersion medium.

Next, the obtained dispersion was left, and the spherical body was spontaneously settled to generate a jelly-like substance in which the plurality of spherical bodies were regularly arranged. The jelly-like substance was naturally dried in the air to obtain a dried product. The obtained dried product was calcined at 800° C. to obtain a three-dimensional array structure of the spherical body.

Then, the gap of the three-dimensional array structure was filled with a resin including a fluorescent dye to obtain a jewelry member. The content of the spherical body was 80% by mass, and the content of the resin was 20% by mass in the jewelry member based on 100% by mass of the total of the spherical body and the resin. As the resin, an epoxy resin was used. As the fluorescent dye, "Hakkol PSR" manufactured by SHOWA CHEMICAL INDUSTRY CO., LTD. was used. The content of the fluorescent dye was 0.1 parts by mass based on 100 parts by mass of the resin. The heat treatment temperature was 120° C. at which the epoxy resin was cured.

For the obtained jewelry member, the average diameter of the spherical body and the variation in the diameter of the spherical body were measured using a SEM. The measurement sample was a 5 mm square cube, and the range of 6 μm×4 μm on one surface of the cube was analyzed with a resolution of 1 nm. As a result, the average diameter of the spherical body was 270 nm, and the variation in the diameter of the spherical body was ±2%.

Comparative Example 1

A jewelry member was obtained in the same manner as in Example 1 except that no fluorescent dye was added to the resin.

For the obtained jewelry member, the average diameter of the spherical body and the variation in the diameter of the spherical body were measured in the same manner as in Example 1. As a result, the average diameter of the spherical body was 270 nm, and the variation in the diameter of the spherical body was ±2%.

Comparative Example 2

First, the same resin and the same fluorescent dye as in Example 1 were prepared. Next, the fluorescent dye was added to the resin. The addition amount of the fluorescent dye was 0.1 parts by mass based on 100 parts by mass of the resin. Then, the resin was cured at the same heat treatment temperature as in Example 1 to obtain a cured product of the resin containing the fluorescent dye.

<Evaluation>

In Example 1 and Comparative Examples 1 and 2, the presence or absence of play of color, the appearance under black light irradiation, and the fluorescence emission intensity were measured. The method of measurement is as follows.

(Presence or Absence of Play of Color)

The presence or absence of play of color was evaluated by visually observing the appearance. The results are shown in the column of "Play of color" in Table 1.

(Appearance Under Black Light Irradiation)

The state of light emission was visually observed in the appearance under irradiation with ultraviolet light using a black light. The results are shown in the column of "Black light" in Table 1. As the black light, "Black Light Stand ES27BLB" manufactured by Sankyo Denki Co., Ltd. was used.

(Fluorescence Emission Intensity)

Figure 2:
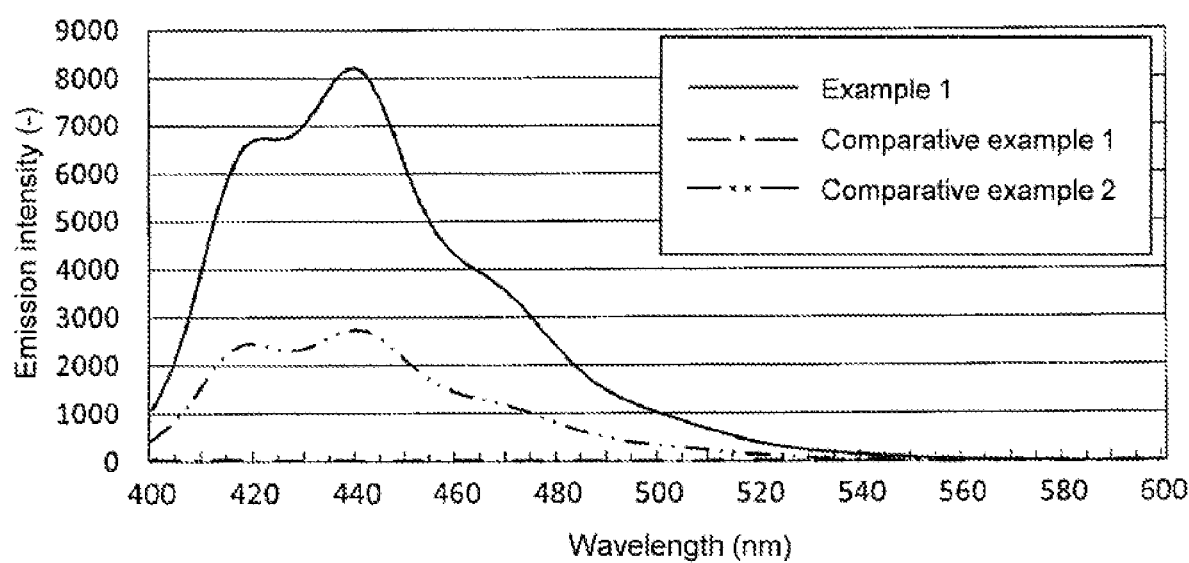
FIG. 2 is a graph showing a result of measuring the fluorescence emission intensity (emission spectrum) in Examples.

The measurement conditions are as follows.
  Measuring device: fluorescence spectrophotometer "F-7000" manufactured by Hitachi High-Technologies Corporation
  Photomultiplier voltage: 330 V
  Excitation wavelength: 375 nm
  Emission wavelength: 420 nm and 440 nm
The shape of the measurement sample is as follows.
  Area: 20 mm square
  Thickness: 1.5 mm Among the measurement results, the values related to the light emission peak intensity (the peak wavelength and the peak height) are shown in Table 1, the emission intensity ratios (Example 1/Comparative Example 2) at the two light emission peaks (in the vicinity of 420 nm and 439 nm) are shown in Table 2, and the emission spectra are shown in FIG. 2.

TABLE 1

| | Play of color | Black Light | Light emission peak intensity (Excitation 375 nm) | |
|---|---|---|---|---|
| | | | Peak (nm) | Height (Data) |
| Example 1 | Present | Light emitted on surface and inside | 421.2 439.2 | 6,758 8,222 |
| Comparative example 1 | Present | No light emitted | None | None |
| Comparative example 2 | Absent | Light emitted only on surface | 419.4 439.4 | 2,457 2,747 |

TABLE 2

| Emission intensity ratios Example 1/Comparative example 2 | |
|---|---|
| Peak in vicinity of 420 nm | 2.75 times |
| Peak in vicinity of 439 nm | 2.99 times |
| Integrated emission intensity | 2.88 times |

As is clear from the results shown in Table 1, Table 2, and FIG. 2, in Comparative Example 1, the play of color was present, but the sample emitted no light even when irradiated with ultraviolet light using a black light. In Comparative Example 2, the play of color was absent, and the sample emitted light only on the surface when irradiated with ultraviolet light using a black light. In contrast, in Example 1, the play of color was present, and the sample emitted light on the surface and the inside when irradiated with ultraviolet light using a black light. It can be seen that the sample emits light with a high fluorescence emission intensity, and the integrated emission intensity is 2.88 times higher than that in Comparative Example 2 in which the sample includes the cured product of the resin including the fluorescent dye.

DESCRIPTION OF THE REFERENCE NUMERAL

1: Jewelry member
2: Spherical body
3: Resin
S: Gap

The invention claimed is:

1. A jewelry member, comprising:
    a plurality of spherical bodies that are three-dimensionally arranged regularly and comprise an amorphous silicic acid; and
    a resin that is located in a gap among adjacent spherical bodies of the plurality of spherical bodies and comprises a single fluorescent dye,
    wherein the single fluorescent dye of the resin of the jewelry member emits light so as to comprise two light emission peaks in a wavelength range of 400 to 450 nm.

2. The jewelry member according to claim 1, wherein the jewelry member has an opal structure.

3. The jewelry member according to any one of claim 1, wherein a content of the single fluorescent dye is 0.01 to 0.5 parts by mass based on 100 parts by mass of the resin.

4. The jewelry member according to any one of claim 1, wherein the resin is a thermosetting resin.

* * * * *